(12) United States Patent
Du

(10) Patent No.: US 10,015,170 B2
(45) Date of Patent: Jul. 3, 2018

(54) PROTECTING DELIVERED WEB DISTRIBUTED CONTENT FROM UNAUTHORIZED MODIFICATIONS

(71) Applicant: Instart Logic, Inc., Mountain View, CA (US)

(72) Inventor: Bowei Du, Mountain View, CA (US)

(73) Assignee: Instart Logic, Inc., Palo Alto, CA (US)

( * ) Notice: Subject to any disclaimer, the term of this patent is extended or adjusted under 35 U.S.C. 154(b) by 599 days.

(21) Appl. No.: 14/472,201

(22) Filed: Aug. 28, 2014

(65) Prior Publication Data

US 2016/0065584 A1    Mar. 3, 2016

(51) Int. Cl.
*H04L 29/06* (2006.01)
*G06F 21/54* (2013.01)
*G06F 21/64* (2013.01)

(52) U.S. Cl.
CPC ............ *H04L 63/102* (2013.01); *G06F 21/54* (2013.01); *G06F 21/645* (2013.01); *H04L 63/0281* (2013.01); *H04L 63/12* (2013.01)

(58) Field of Classification Search
CPC ... H04L 63/102; H04L 63/0281; H04L 63/12; G06F 21/54; G06F 21/645
USPC .......................................................... 726/4
See application file for complete search history.

(56) References Cited

U.S. PATENT DOCUMENTS

| 6,012,087 A * | 1/2000 | Freivald ............... G06F 17/3089 707/E17.116 |
| 2010/0186067 A1* | 7/2010 | Stephenson ............. G06F 21/10 726/4 |

OTHER PUBLICATIONS

Thomas Koutny, 2010, IEEE, Fifth International Conference, Detecting Unauthorized Modification of HTTP Communication with Steganography, pp. 26-31.*

* cited by examiner

*Primary Examiner* — Kambiz Zand
*Assistant Examiner* — Benjamin Kaplan
(74) *Attorney, Agent, or Firm* — Van Pelt, Yi & James LLP

(57) ABSTRACT

A method of delivering web distributed content is disclosed. A set of web distributed content is received by a proxy server. The set of web distributed content is divided by the proxy server into a plurality of portions. Additional security code is added to the plurality of portions to form a modified set of web distributed content. The additional security code detects unauthorized modification of the modified set of web distributed content, wherein at least a portion of the modified set of web distributed content is different for different intended users of the set of web distributed content. The modified set of web distributed content is delivered by the proxy server to an intended user.

23 Claims, 6 Drawing Sheets

| Characters |
|---|
| Sheep.jpg |
| Strawberry.jpg |
| Cat.mpeg |
| · · · |

| Symbol Table |
|---|
| actionscripts |

| Timeline |
|---|
|    new sheep()<br>   new cat()<br>     ·<br>     ·<br>   screen.display(sheep, x, y) |

FIG. 2

PROTECTING DELIVERED WEB DISTRIBUTED CONTENT FROM UNAUTHORIZED MODIFICATIONS

BACKGROUND OF THE INVENTION

As content and executable code downloaded from the World Wide Web (the web) are publicly available and disseminated, the executable code may be reverse-engineered and the content may be tampered by third parties other than the content publisher, including competitors, hackers, and the like.

BRIEF DESCRIPTION OF THE DRAWINGS

Various embodiments of the invention are disclosed in the following detailed description and the accompanying drawings.

FIG. 2 is a diagram illustrating an embodiment of a SWF file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
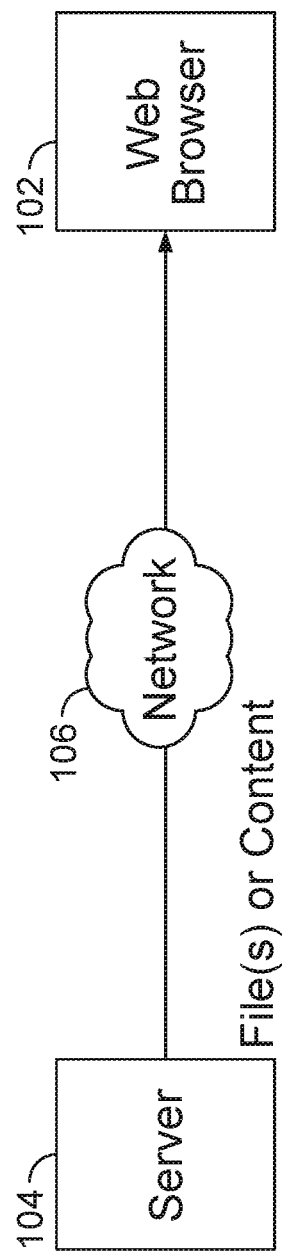
FIG. 1 is a block diagram illustrating an embodiment of a web browser downloading content or files through a network.

FIG. 1 is a block diagram illustrating an embodiment of a web browser downloading content or files through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of user devices, including laptop computers, desktop computers, tablet computers, smartphones, and other mobile devices.

Running a web application, web browser 102 downloads a plurality of files from server 104 through network 106. The web application may be a browser game application, i.e., a computer game played over the Internet using a web browser. Browser games include social network games, such as FarmVille, Mafia Wars, FrontierVille, and the like. These social network games are online games that are distributed through social networks, e.g., Facebook, and may feature multiplayer gameplay mechanics. The popular browser-based social network game, FarmVille, is used hereinafter as an example for the web application described above. Farmville is selected for illustration purposes only; accordingly, the present application is not limited to this specific example only.

FarmVille is a farm simulation game available as an application on the social networking website Facebook. The game allows members of Facebook to manage a virtual farm by planting, growing, and harvesting virtual crops and trees, or raising livestock. While the game is running, one or more SWF (Small Web Format) files are sent by server 104 to web browser 102 through network 106. These SWF files provide the application on the client side with resources it needs for starting and running the game. SWF can be used to present vector-based objects and images, audio, video, text, and other forms of interaction with the end user. After the one or more SWF files are received on the client side, the SWF files can be played by an Adobe Flash Player as a browser plugin. For example, text can be displayed, audio can be played, and movie clips can be played as the game begins.

FIG. 2 is a diagram illustrating an embodiment of a SWF file. A SWF file has different sections, including the character, symbol table, and timeline sections. The character section is used to store content, such as images, movie clips, audio, and the like. For example, the character section of a SWF file sent by a FarmVille server may include image files (e.g., bitmap or jpeg files) and movie clips files (e.g., mpeg files) of various crops that may be planted in the farm, farm animals that can be raised in the farm, and the like. The timeline section has code to define how the animation of the game should progress over time. For example, the timeline may specify that a particular farm animal, e.g., a sheep, should be displayed at time t0 at a particular position on the screen. The symbol section includes code, e.g., actionscripts, for loading the image file (e.g., sheep.jpg or sheep.bmp) of the farm animal from the character section. The loaded image can then be displayed on the screen at the specified time and location. The symbol table section also includes character ID and class name information.

After web browser 102 downloads the plurality of files from server 104 through network 106, an end user may reverse-engineer the executable code or tamper with the content in the files. In the Farmville example above, a game hacker may create hacked versions of the SWF files that allow the game hacker to cheat and gain an advantage beyond normal gameplay, e.g., to make the game advances to higher play levels faster and easier, resulting in lost profits for the game publisher. For example, Farmville has in-game currencies that provide ways for the game player to acquire additional in-game items, such as additional animals for the farm, or to acquire in-game resources like animal feed, water, fuel and power, which are otherwise slow and/or laborious for game players to acquire. Since the in-game currencies are available for purchase from the game publisher with real-world money, game cheating would result in lost profits for the game publisher. To make things worse, once the hacked versions of the SWF files are created, they can be posted online and shared, thus making the cheat files available to a large number of game players.

Typically, the files downloaded from server 104 to web browser 102 include a main file (also referred to as a main bootstrap file) and a plurality of secondary files. In the Farmville example above, a main SWF file is downloaded and run on web browser 102 first, and as the game progresses, the main SWF file references a plurality of secondary SWF files and the secondary SWF files are then downloaded to web browser 102 at a later time. In other examples, the downloaded files may be JavaScript files. A main JavaScript file is downloaded and runs on web browser 102 first, and as the application progresses, the main JavaScript file references a plurality of secondary JavaScript files and the secondary JavaScript files are then downloaded to web browser 102. A game hacker may create a hacked version of any of the downloaded files, including the main file (e.g., the main SWF or main JavaScript file) or any of the secondary files (e.g., a secondary SWF or JavaScript file), and replace the original downloaded file with the corresponding hacked version of the file. For example, the game hacker may use Fiddler, an HTTP debugging proxy tool, to replace an original file with a hacked version of the file in the browser cache. Therefore, a technique to counter the hacking of web distributed content delivered to an application running on a web browser would be desirable.

Figure 3:
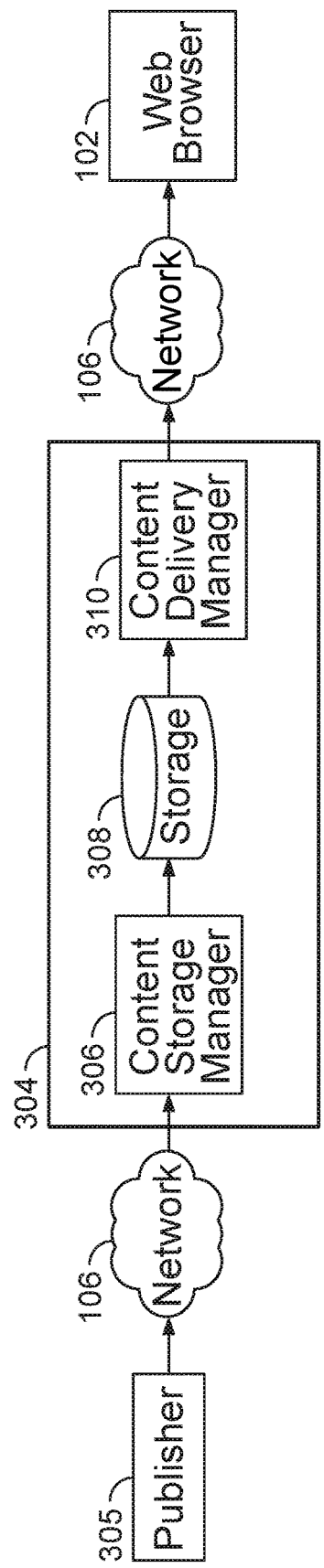
FIG. 3 is a block diagram illustrating an embodiment of a proxy server 304 for delivering web distributed content, wherein the delivered web distributed content includes security code to detect unauthorized modification of the delivered content by a user.
Figure 4:
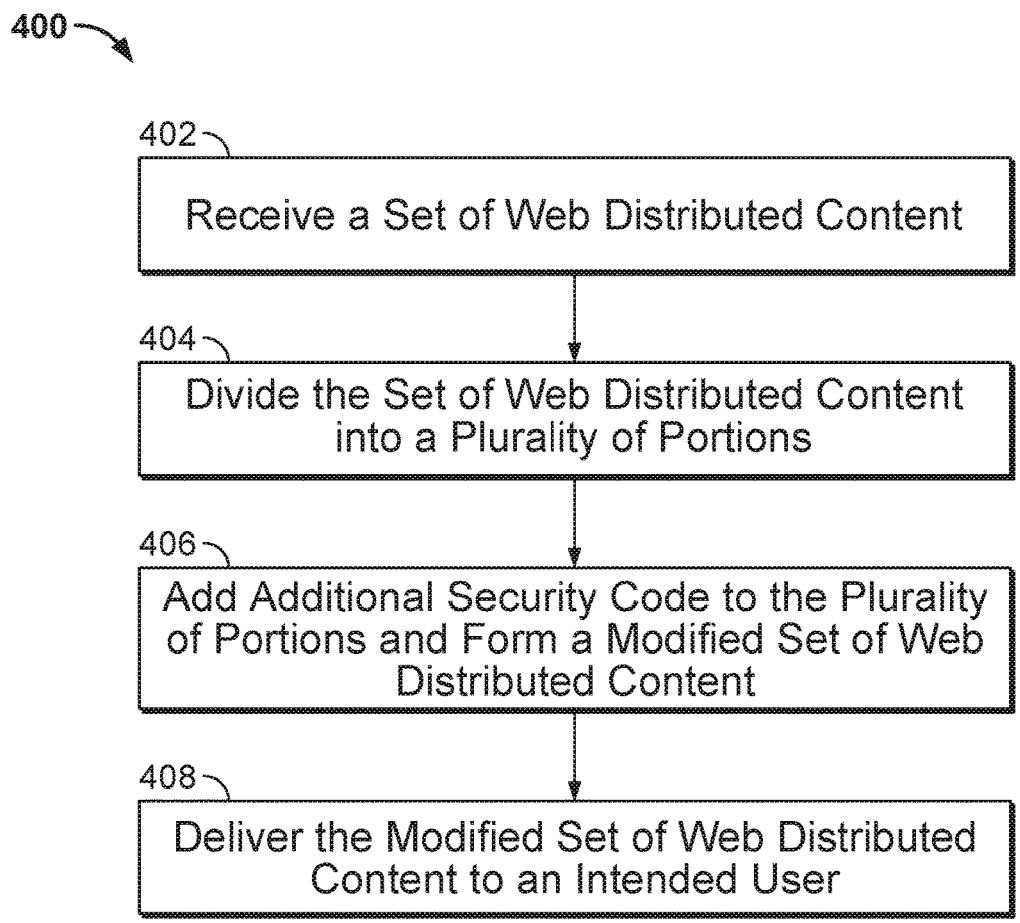
FIG. 4 is a flow chart illustrating an embodiment of a process 400 for delivering web distributed content using a proxy server.

FIG. 3 is a block diagram illustrating an embodiment of a proxy server 304 for delivering web distributed content, wherein the delivered web distributed content includes security code to detect unauthorized modification of the delivered content by a user. FIG. 4 is a flow chart illustrating an embodiment of a process 400 for delivering web distributed content using a proxy server. In some embodiments, process 400 is a process that runs on proxy server 304 of FIG. 3.

With reference to FIGS. 3 and 4, at 402, a set of web distributed content is received by proxy server 304, e.g., an Instart proxy server. The set of web distributed content may be sent directly from a publisher 305 of a web application to proxy server 304. In the FarmVille example, the set of web distributed content includes the original SWF file(s) provided by the game publisher of FarmVille (i.e., Zynga). These original SWF files (e.g., A.swf, B.swf, and C.swf) are the SWF files that are normally downloaded to the user's web browser when the game is started and run. Proxy server 304 may periodically obtain the most updated version of these original SWF files from publisher 305. In other examples, the set of web distributed content may include JavaScript file(s) provided by the publisher of the web application. Other types of files may be provided by the publisher as well.

At 404, the set of web distributed content is divided into a plurality of portions. In some embodiments, step 404 may be performed by a content storage manager 306 of proxy server 304. The set of web distributed content may be divided into portions based on the type of the content or its size for caching or storage. The portions are then stored into a storage device 308.

At 406, additional security code is added to the plurality of portions. The plurality of portions of the set of web distributed content, combined with the additional security code, are then assembled together to form a modified set of web distributed content. In the FarmVille example, the modified set of web distributed content may be one or more SWF files (e.g., D.swf, E.swf, F.swf, and G.swf). In other examples, the modified set of web distributed content may be one or more JavaScript files.

While a one-to-one correspondence between the original (SWF, JavaScript, or other types of file) file(s) and the modified file(s) is possible, it is not required. For example, the number of original files and the number of modified files is not necessarily the same. In one example, A.swf is the original main SWF file, while B.swf and C.swf are the original secondary SWF files referenced by A.swf. D.swf is the modified main SWF file, while E.swf, F.swf, and G.swf are the modified secondary SWF files that are referenced by D.swf. In some embodiments, the contents of the original files may be re-arranged or re-ordered before they are reassembled into the modified files.

The additional security code detects any unauthorized modification of the modified set of web distributed content, and in response to such detections, appropriate steps may be further taken, as will be described in greater detail below.

The modified set of web distributed content is formed in such a way that at least a portion of the modified set of web distributed content is different for different intended users of the set of web distributed content. For example, one or more of the modified files sent to the user is unique for each user. In some embodiments, the contents of the original files may be re-arranged or re-ordered before they are reassembled into the modified files such that some or all of the modified files are personalized for different users. In some other embodiments, at least some of the additional security code is selected such that it is different for different intended users of the set of web distributed content. As the modified set of web distributed content includes the security code that is unique per user, at least some of the modified set of web distributed content is also unique per user. One of the benefits of the modified set of web distributed content being unique per user is that even if a hacker has created a hacked version of a particular downloaded file and makes it available to other users/players by posting it online, the hacked version cannot be used by other users/players, for example by replacing the file with the hacked version of the file in the browser cache.

In some embodiments, step 406 is performed by a content delivery manager 310 of proxy server 304. Content delivery manager 310 of proxy server 304 retrieves the plurality of portions of the set of web distributed content stored in storage device 308 and assembles the retrieved portions with the security code together to form the modified set of web distributed content.

At 408, the modified set of web distributed content is delivered to an intended user. In some embodiments, step 408 is performed by content delivery manager 310 of proxy server 304.

In some embodiments, the modified main bootstrap file includes security code that checks the integrity of the secondary modified files. For example, security code may be added to the modified main bootstrap file to determine whether a secondary file that is about to be loaded matches with the expected signature of the secondary file. In one example, the signature is a hash value. The security code in the modified main bootstrap file uses a hash function (e.g., MD5 and SHA-1) to map the secondary file or parts of the secondary file to a hash value. If the hash value does not match with the expected signature for the particular secondary file, then unauthorized modification of that secondary file is detected.

Signatures for different modified secondary files are unique and different from each other. Accordingly, the modified main bootstrap file includes a manifest of signatures, with one signature corresponding to a different secondary file.

In some embodiments, the signature for a modified secondary file for one user may be different from that for a different user. As described earlier, a modified file can be personalized for different users. Therefore, a modified secondary file (e.g., F.swf) for user A may have a different signature than that for user B. This further prevents a hacked version of a file to be shared across multiple users.

Figure 5:
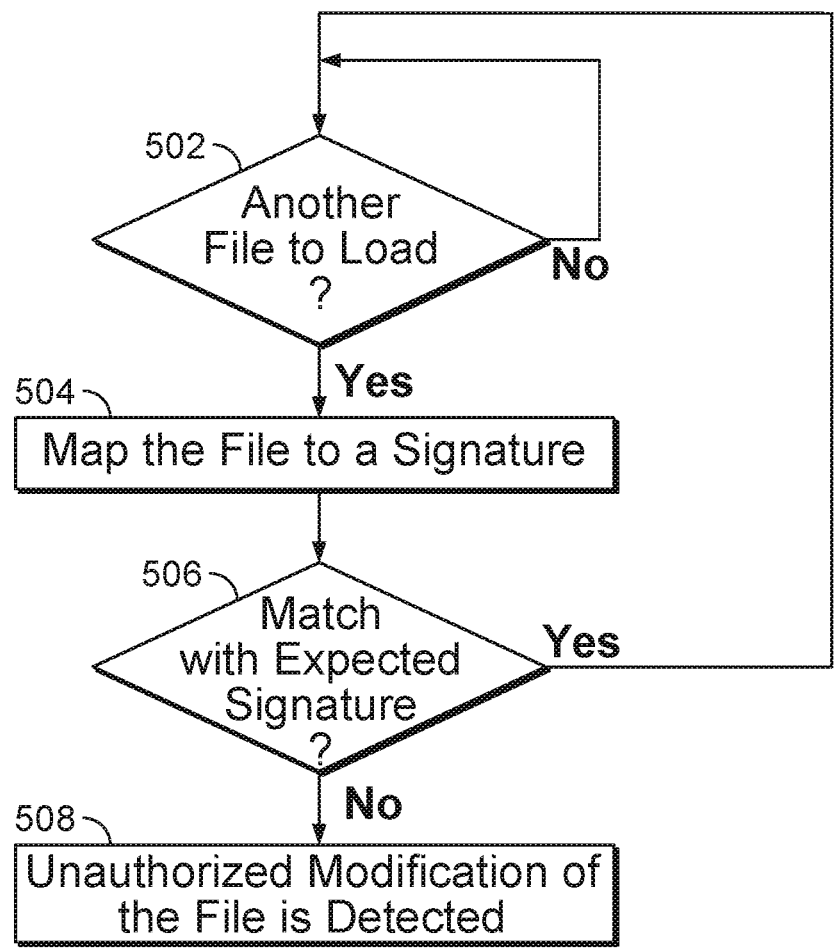
FIG. 5 is a flow diagram illustrating an embodiment of a process 500 for detecting unauthorized modification of a secondary file.

FIG. 5 is a flow diagram illustrating an embodiment of a process 500 for detecting unauthorized modification of a secondary file. At 502, it is determined whether there is another file that is ready to be loaded. If there is another file ready to be loaded, then the file is mapped using a hash function to a hash value at 504. Otherwise, the process returns to step 502 again. At 506, it is determined whether the hash value determined at 504 matches with the expected signature for the file. If a match is found, then the file is allowed to be loaded, and the process returns to step 502. Otherwise, unauthorized modification of the file is detected at 508. In the event that unauthorized modification of the file is detected, the application may be terminated immediately. In some embodiments, the user may be locked out from using the application for a period of time.

In some embodiments, the security code included in the modified main bootstrap file interacts with proxy server 304 in detecting unauthorized modifications of a secondary file. For example, the security code running on web browser 102 may send the hash values of the files back to proxy server 304 for matching. The advantage is that a manifest of signatures for the secondary files does not need to be sent to web browser 102, thereby reducing the chance that the signatures may be reversed-engineered by a hacker.

In some embodiments, techniques are used to make reverse engineering of the modified main bootstrap file more difficult. The modified main bootstrap file includes the portions of the security code for detecting unauthorized modifications of the secondary files. When the main file is loaded and run, the security code therein runs and verifies the integrity of each of the secondary file referenced by the main file before the secondary file is loaded. By making sure that the main file is more resistant from tampering, the main file can be trusted to reliably detect any unauthorized modifications of the secondary files as well. Many techniques may be used to make reverse engineering of the modified main bootstrap file more difficult. Each of the techniques described below may be used individually or in combinations.

In some embodiments, the modified main bootstrap file is formed in such a way that the file is unique for each user. In some embodiments, the modified main bootstrap file sent to a particular user is varied over time. For example, every time when user A runs the application, he receives a different modified main bootstrap file from proxy server 304. As a result, even if the main file has been successfully reverse-engineered by a hacker once, the hacked version of that file will no longer be valid the next time he runs the application again. Since the modified main bootstrap file constantly changes, the file becomes non-cachable. In order to keep most of the contents delivered by the files cachable, the modified files may be formed in such a way that the main bootstrap file includes the security code and/or data for bootstrapping the application, and that the secondary files include the majority of the contents and executable code. This way, the main bootstrap file, which is non-cachable, is kept at a small size, thereby improving overall performance.

Figure 6:
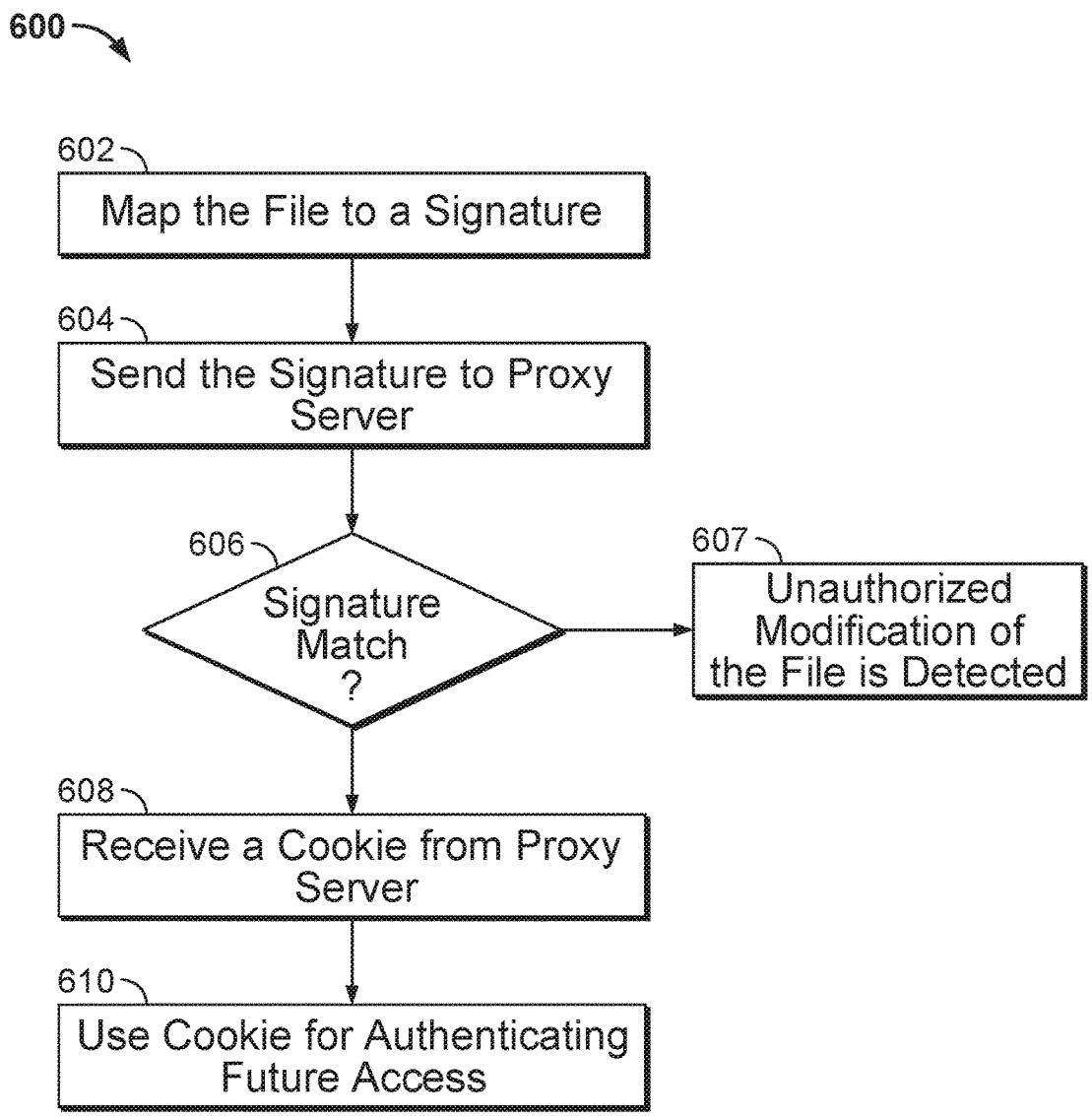
FIG. 6 is a flow diagram illustrating an embodiment of a process 600 wherein the security code and proxy server 304 jointly determine whether the main file matches with the expected signature of the file.

In some embodiments, the security code included in the modified main bootstrap file and running on web browser 102 interacts with proxy server 304 in detecting unauthorized modifications of the main file. The security code and proxy server 304 jointly determine whether the main file matches with the expected signature of the file, as shown in the flow diagram of process 600 in FIG. 6. At 602, the security code in the modified main bootstrap file uses a hash function to map the file or parts of the file to a hash value. At 604, the hash value is then sent back to proxy server 304 for matching. If the hash value does not match for the given user, then unauthorized modification of the file has been detected at 607. If the hash value matches for the given user, then a cookie is sent by proxy server 304 and received by web browser 102 at 608. Subsequently, the cookie may be used to authenticate any future access by the main file at 610. For example, if the cookie is invalid, then proxy server 304 may deny any access or make the application terminates. In some embodiments, the lifespan of the cookie may be shortened such that a compromised cookie cannot be reused by a hacker at a later time. The lifespan of the cookie may be configured to one hour, a few hours, a day, and the like. Once a cookie has expired, the modified main bootstrap and proxy server 304 would need to determine whether the main file matches with the expected signature and obtain a new cookie all over again, for example by performing process 600 again.

In some embodiments, an obfuscated hash function family may be used by the modified main bootstrap file. The obfuscated hash function family is a parameterized family of hash functions, which can be used to generate new obfuscated hash functions by changing one or more parameters. If the modified main bootstrap file is compromised, a new signature may be easily regenerated using a new obfuscated hash function.

In some embodiments, the URL (uniform resource locator) for the modified main bootstrap file may include a randomized string. This makes it more difficult for a hacker to predict the URL and thus make it more difficult to replace the modified main bootstrap file. For example, when web browser 102 tries to download the modified main boostrap file, proxy server 304 may respond with a HTTP response status code 302 and redirect web browser 102 to a new URL. In particular, web browser 102 is requested by the response with the HTTP response status code 302 to make a second, otherwise identical, request, to the new URL specified in the Location field. The new URL includes a randomized string. For example, suppose that the original URL is http://www.websitename.com/game.swf. The new URL may be http://www.websitename.com/randomstringgame.swf, where randomstringame is a randomly generated text string concatenated with the original name "game."

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering web distributed content, comprising:
   receiving a set of web distributed content by a proxy server;
   dividing the set of web distributed content into a plurality of portions by the proxy server;
   adding additional security code to the plurality of portions and forming a modified set of web distributed content by the proxy server, the additional security code detecting unauthorized modification of the modified set of web distributed content, and wherein at least a portion of the modified set of web distributed content is different for different intended users of the set of web distributed content; and
   delivering the modified set of web distributed content to an intended user by the proxy server.

2. The method of claim 1, wherein forming the modified set of web distributed content further comprises re-ordering the set of web distributed content and reassembling it into the modified set of web distributed content such that at least a portion of the modified set of web distributed content is different for different intended users of the set of web distributed content.

3. The method of claim 1, further comprising selecting at least some of the additional security code such that it is different for different intended users of the set of web distributed content.

4. The method of claim 1, wherein the modified set of web distributed content comprises a modified main file that references and causes the loading of one or more modified secondary files.

5. The method of claim 4, wherein one or more of the modified files is different for different intended users of the set of web distributed content.

6. The method of claim 4, wherein at least some of the additional security code is included in the modified main file, the additional security code included in the modified main file comprising code for:
   mapping at least a portion of one of the modified secondary files to a signature;
   matching the signature to an expected signature; and
   in the event that the signature and the expected signature do not match, determining that unauthorized modification of the secondary file is detected.

7. The method of claim 4, wherein at least some of the additional security code is included in the modified main file, the additional security code included in the modified main file comprising code for:
   mapping at least a portion of one of the modified secondary files to a signature;
   sending the signature to the proxy server, wherein the signature is matched with an expected signature by the proxy server, and wherein the proxy server determines that unauthorized modification of the secondary file is detected in the event that the signature and the expected signature do not match.

8. The method of claim 7, wherein the expected signature for the intended user is not the same as the expected signature for other intended users.

9. The method of claim 4, wherein the modified main file delivered to the intended user at a first time is different from the modified main file delivered to the intended user at a second time.

10. The method of claim 4, wherein at least some of the additional security code is included in the modified main file, the additional security code included in the modified main file comprising code for:
    mapping at least a portion of the modified main file to a signature;
    sending the signature to the proxy server, wherein the signature is matched with an expected signature by the proxy server, and
    receiving a cookie from the proxy server in the event that the proxy server determines that unauthorized modification of the secondary file has not been detected based on a matching between the signature and the expected signature.

11. The method of claim 4, further comprising:
    including a randomized string in an URL (uniform resource locator) corresponding to the modified main file.

12. A proxy server for delivering web distributed content, comprising:
    an interface receiving a set of web distributed content;
    a content storage manager that divides the set of web distributed content into a plurality of portions; and
    a content delivery manager configured to:
       add additional security code to the plurality of portions and forms a modified set of web distributed content; and
       deliver the modified set of web distributed content to an intended user, wherein the additional security code detects unauthorized modification of the modified set of web distributed content, and wherein at least a portion of the modified set of web distributed content is different for different intended users of the set of web distributed content.

13. The proxy server of claim 12, wherein forming the modified set of web distributed content further comprises re-ordering the set of web distributed content and reassembling it into the modified set of web distributed content such that at least a portion of the modified set of web distributed content is different for different intended users of the set of web distributed content.

14. The proxy server of claim 12, further comprising selecting at least some of the additional security code such that it is different for different intended users of the set of web distributed content.

15. The proxy server of claim 12, wherein the modified set of web distributed content comprises a modified main file that references and causes the loading of one or more modified secondary files.

16. The proxy server of claim 15, wherein one or more of the modified files is different for different intended users of the set of web distributed content.

17. The proxy server of claim 15, wherein at least some of the additional security code is included in the modified main file, the additional security code included in the modified main file comprising code for:

mapping at least a portion of one of the modified secondary files to a signature;

matching the signature to an expected signature; and in the event that the signature and the expected signature do not match, determining that unauthorized modification of the secondary file is detected.

18. The proxy server of claim 15, wherein at least some of the additional security code is included in the modified main file, the additional security code included in the modified main file comprising code for:

mapping at least a portion of one of the modified secondary files to a signature;

sending the signature to the proxy server, wherein the signature is matched with an expected signature by the proxy server, and wherein the proxy server determines that unauthorized modification of the secondary file is detected in the event that the signature and the expected signature do not match.

19. The proxy server of claim 18, wherein the expected signature for the intended user is not the same as the expected signature for other intended users.

20. The proxy server of claim 15, wherein the modified main file delivered to the intended user at a first time is different from the modified main file delivered to the intended user at a second time.

21. The proxy server of claim 15, wherein at least some of the additional security code is included in the modified main file, the additional security code included in the modified main file comprising code for:

mapping at least a portion of the modified main file to a signature;

sending the signature to the proxy server, wherein the signature is matched with an expected signature by the proxy server, and receiving a cookie from the proxy server in the event that the proxy server determines that unauthorized modification of the secondary file has not been detected based on a matching between the signature and the expected signature.

22. The proxy server of claim 15, wherein an URL (uniform resource locator) corresponding to the modified main file includes randomized string.

23. A computer program product for delivering web distributed content, the computer program product being embodied in a non-transitory computer readable storage medium and comprising computer instructions for:

receiving a set of web distributed content;

dividing the set of web distributed content into a plurality of portions;

adding additional security code to the plurality of portions and forming a modified set of web distributed content, the additional security code detecting unauthorized modification of the modified set of web distributed content, and wherein at least a portion of the modified set of web distributed content is different for different intended users of the set of web distributed content; and delivering the modified set of web distributed content to an intended user.

* * * * *

UNITED STATES PATENT AND TRADEMARK OFFICE
CERTIFICATE OF CORRECTION

PATENT NO. : 10,015,170 B2
APPLICATION NO. : 14/472201
DATED : July 3, 2018
INVENTOR(S) : Bowei Du Page 1 of 1

It is certified that error appears in the above-identified patent and that said Letters Patent is hereby corrected as shown below:

In the Specification

In Column 6, Line 62, after "main", delete "boostrap" and insert --bootstrap--, therefor.

In Column 7, Line 4 & 5, after "where", delete "randomstringame" and insert --randomstringgame--, therefor.

Signed and Sealed this
Eleventh Day of December, 2018

Andrei Iancu
*Director of the United States Patent and Trademark Office*